June 16, 1936.   C. C. KINKER   2,044,616
REVOLVING POT
Filed Nov. 27, 1933   4 Sheets-Sheet 1
FIG-1-
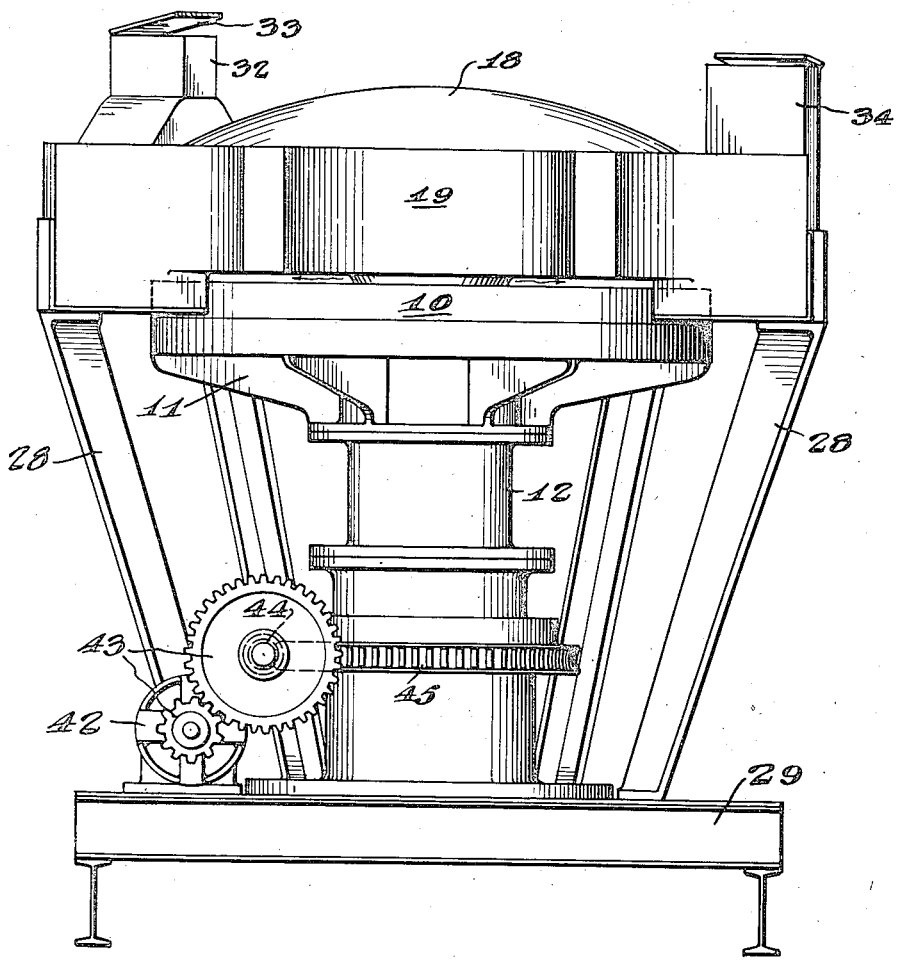

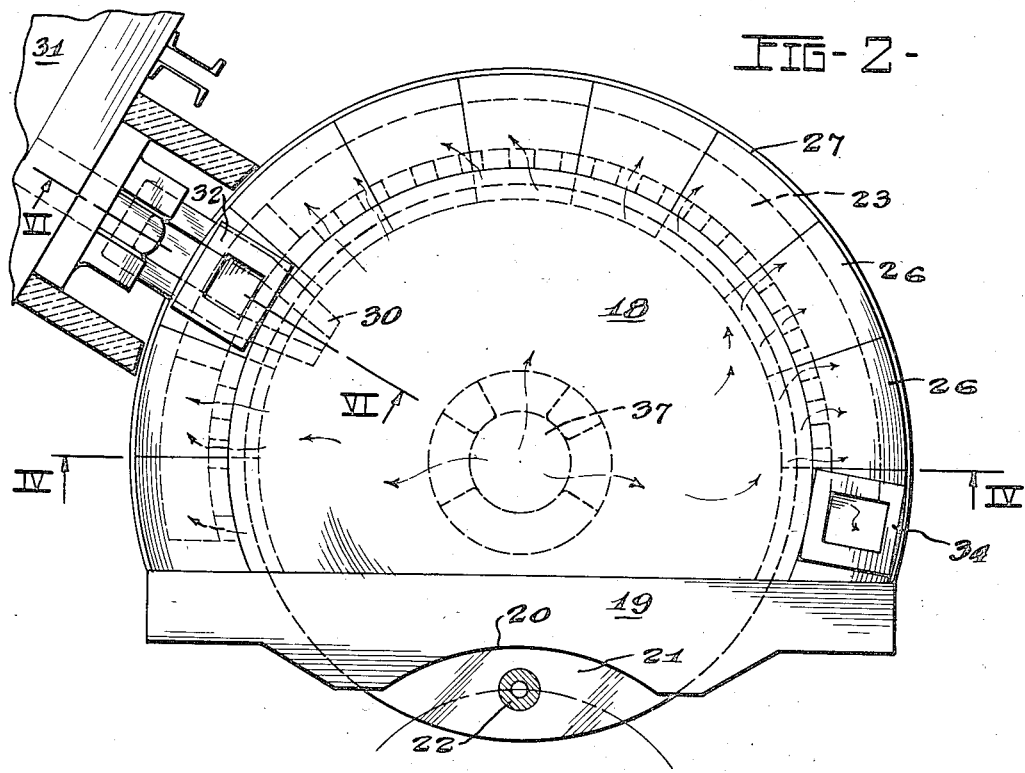
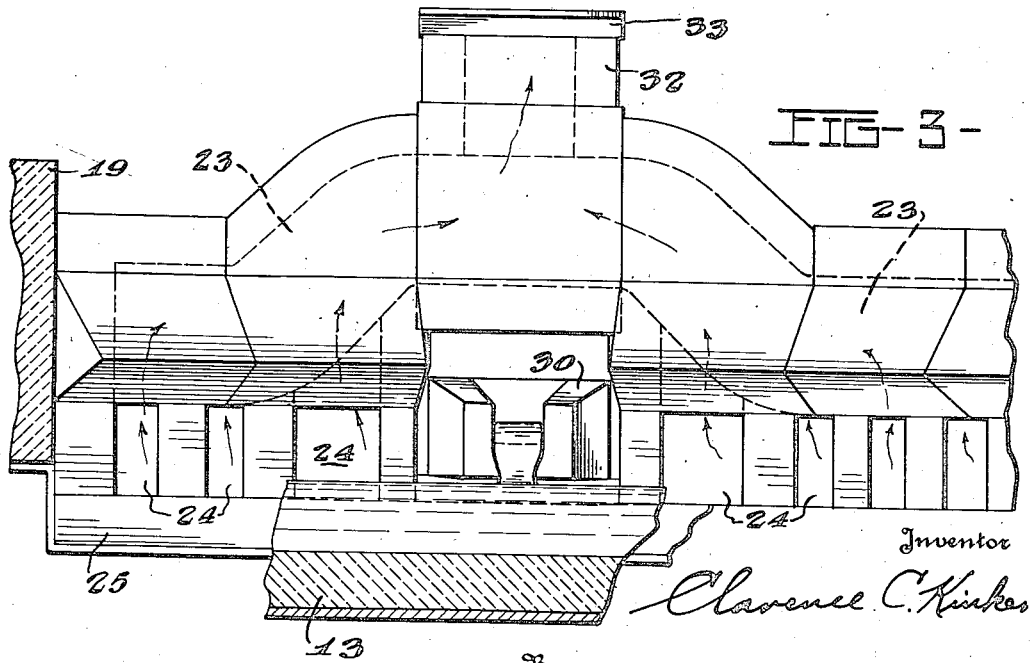

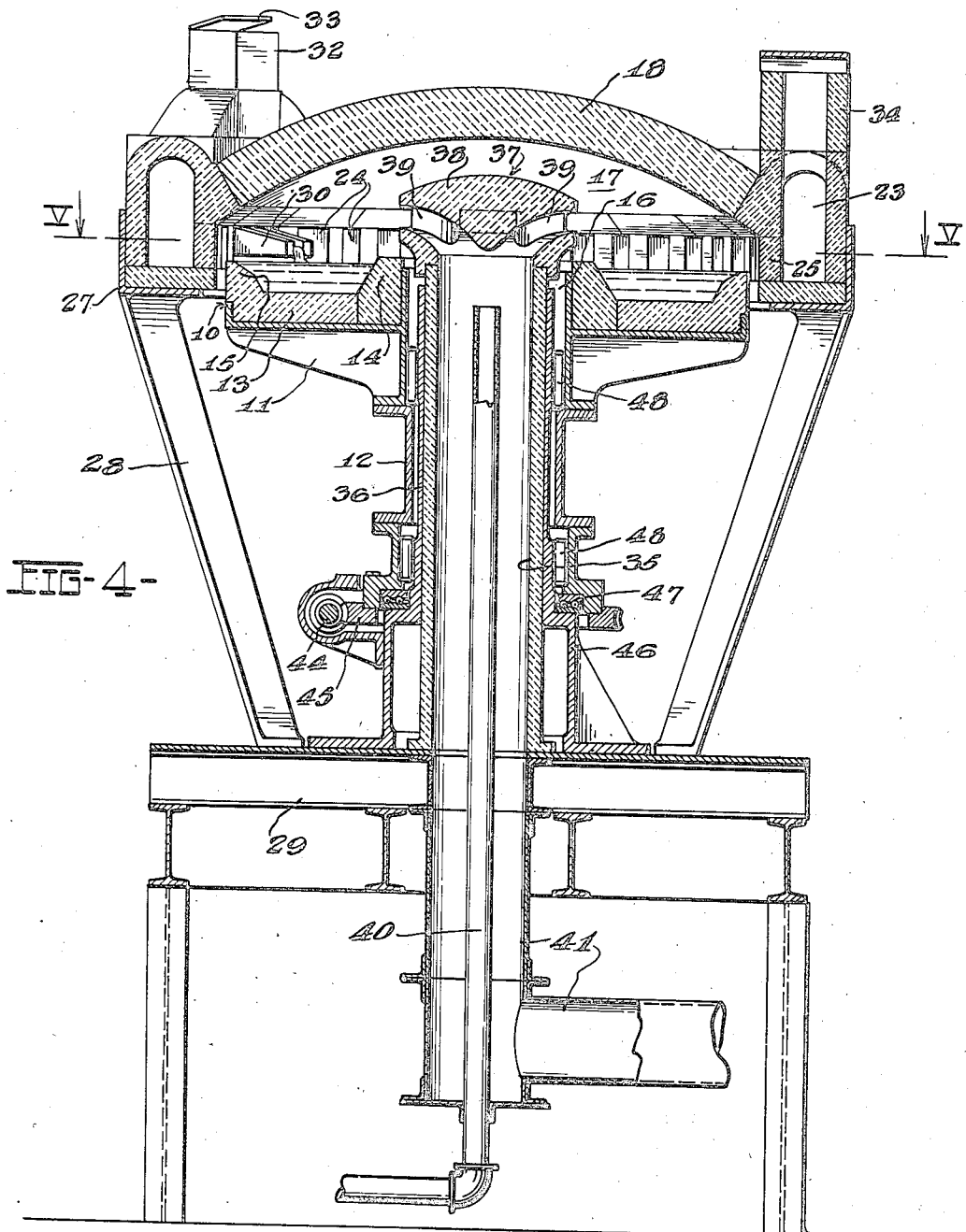

June 16, 1936.　　　C. C. KINKER　　　2,044,616
REVOLVING POT
Filed Nov. 27, 1933　　　4 Sheets-Sheet 4
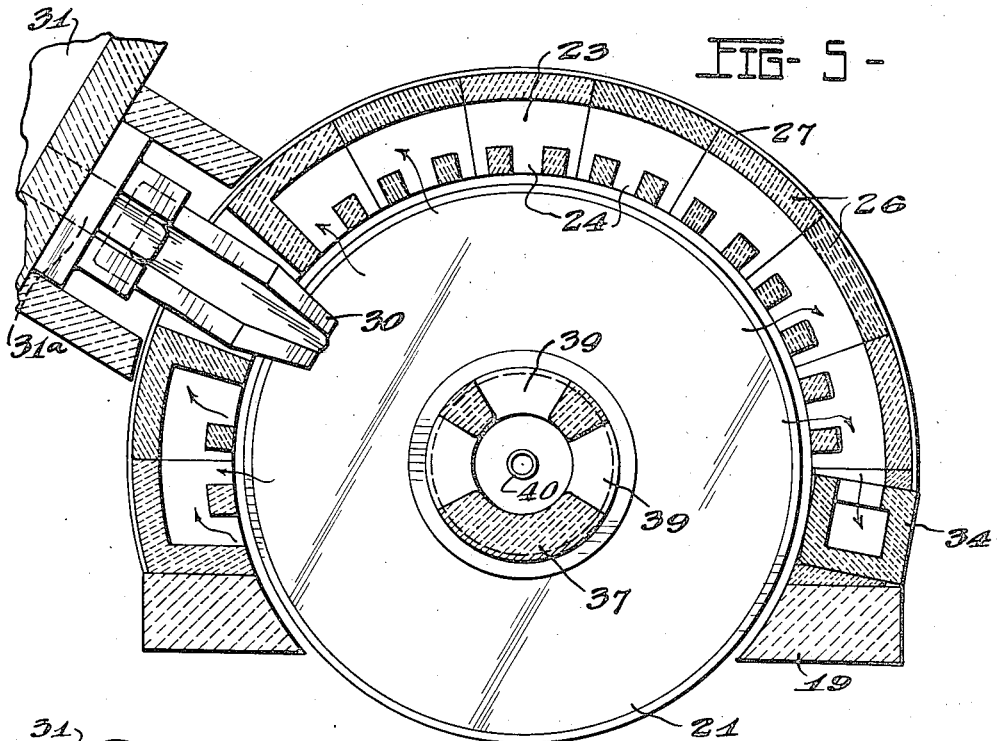
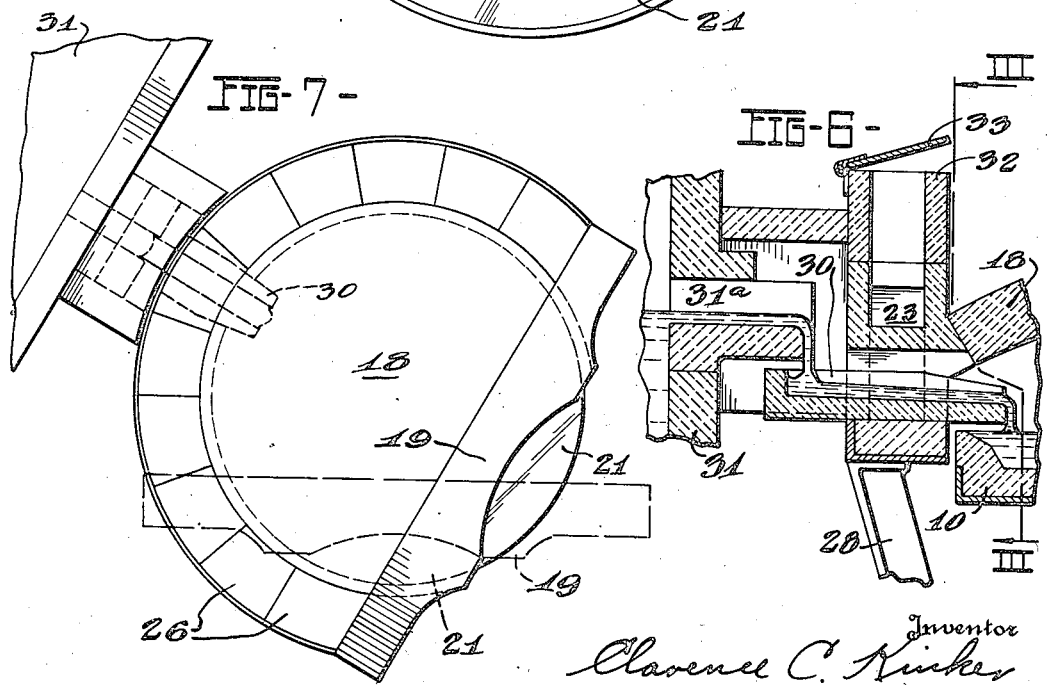

Patented June 16, 1936

2,044,616

UNITED STATES PATENT OFFICE 2,044,616

REVOLVING POT

Clarence C. Kinker, Alton, Ill., assignor to Owens-Illinois Glass Company, a corporation of Ohio Application November 27, 1933, Serial No. 699,818

6 Claims. (Cl. 49—56)

The present invention relates to improvements in revolving pots of the kind rather generally employed in supplying molten glass to bottle forming machines of the well known Owens type which gather their mold charges by suction while moving continuously.

One conventional form of "shop" for the production of glass containers consists of a stationary melting tank, a revolving pot or container, and a stationary cover therefor, a suction type bottle machine and an annealing leer. In this "shop" the cover for the revolving pot or container has a portion of its margin cut away to provide an exposed gathering area of glass from which the machine obtains mold charges, the cover functioning solely to provide a combustion chamber over the pot and to retard dissipation of heat from the glass. Moreover the cover is stationary and cannot be moved, with the result that the exposed gathering area is definitely fixed and cannot be changed as to its position relative to the tank and machine, except by tearing down and rebuilding the superstructure.

It is also the common and generally accepted practice in regulating and controlling the temperature of glass in revolving pots to apply heat to the surface of the glass by means of burners projecting inwardly from one or more points in proximity to the outer wall of the pot or other container. Such an arrangement is considered to create conditions in which the heat is not uniformly distributed over the surface of the glass with the result that the glass lacks uniformity of temperature and viscosity. This condition is reflected in the articles of glassware in the form of strains and stresses which render the glassware unsuitable for marketing.

An object of the present invention is the provision of means whereby the position of the exposed gathering area of glass may be changed with facility as may be necessary because of changes in the relative locations of the leer, forming machine, and melting tank. To this end the present invention provides for adjustment of the cover portion horizontally about the axis of rotation of the revolving pot.

Another object is the provision of means for applying a flame or flames to the surface of molten glass in a rotary container in a fashion to avoid the usual "sting out" beneath the jack arch which causes excessive heating of the bottle machine. To this end a burner block is arranged above a central vertical opening extending through the container and arranged to direct the burning fuel in all directions except toward the jack arch.

A further object is the provision of means whereby the applied heat may be more or less uniformly distributed over the surface of the glass in a revolving pot and thereby effect and maintain uniformity of temperature and viscosity throughout the body of glass. To this end there is provided a flue extending partially around the revolving pot and communicating with a combustion chamber over the latter by way of a series of horizontal ports.

Other objects will be in part apparent and in part pointed out hereinafter.

In the drawings:

Fig. 1 is a front elevational view.

Fig. 2 is a top plan view.

Fig. 3 is a detail sectional view taken substantially along the line III—III of Fig. 6.

Fig. 4 is a sectional view taken along the line IV—IV of Fig. 2.

Fig. 5 is a horizontal sectional view taken substantially along the line V—V of Fig. 4.

Fig. 6 is a sectional view taken along the line VI—VI of Fig. 2.

Fig. 7 is a top plan view showing in full and dotted lines two adjustments of the cover and jack arch for changing the position of the gathering area.

The illustrated embodiment of my invention includes a revolving circular trough 10 mounted upon a metal holder 11 or frame for rotation about a vertical axis which is coaxial with a rotating column 12 carrying said holder. The circular trough 10 is built up of refractory blocks and includes a floor 13 and inner and outer vertical concentric walls 14 and 15 respectively, the former providing a central vertical opening 16 through which fuel may be introduced into a combustion chamber 17 as will be apparent presently. This combustion chamber 17 is created by covering a major portion of the trough by means of a cover 18 or roof and a jack arch 19. The cover is of concavo-convex form and abuts the inner surface of the jack arch wall 19, the latter having a recess 20 provided in its front face so that a portion of the body of molten glass in the trough is exposed and provides a gathering area 21 from which the blank molds 22 of a suction machine (not shown) may gather mold charges.

In order that the applied heat may be more or less uniformly distributed over the surface of the glass in the trough and the waste gases of combustion removed from the combustion chamber 17, I provide a flue 23 extending partially about the periphery of the cover 18 or roof, said flue terminating substantially at the opposite ends of the jack arch 19. A series of ports 24 in the inner vertical wall 25 of the flue, provide communication between the latter and the combustion chamber in proximity to the outer wall 15 of the trough. As indicated in Fig. 2 the flue 23 may well be made up of individual sections 26 which are readily removable and supported in a metal frame 27 at the upper end of an annular series of vertical posts 28 rising from and slidingly resting upon a base 29.

One of these flue sections (Figs. 2 and 3) includes a delivery trough 30 through which molten glass flows to the circular trough 10 from a stationary supply tank 31. This particular flue section may also include an exhaust stack 32 and damper 33 through which the waste gases of combustion may pass off to the atmosphere and the draft controlled and regulated. A second stack 34 may be provided at the opposite end of the flue for the purpose of accelerating the removal of the waste gases of combustion and assisting in creating substantially uniform draft conditions in the combustion chamber 17 over the trough.

Fuel is supplied to the combustion chamber 17 by way of the central vertical opening 16 in the circular trough 10. The specific construction includes a stationary conduit 35 for air rising from the base 29 and extends entirely through the central column 12. This conduit preferably is formed of refractory material and is partly encased in a metal tube 36 about which said column 12 rotates. A refractory burner block 37 mounted at the upper end of the conduit 35 includes a crown portion 38 and a plurality of substantially horizontal ports 39 through which the fuel mixture is exhausted into the combustion chamber 17. It is to be noted that none of these ports face the jack arch 19 so that there is little likelihood of a "sting out" beneath the jack arch being created. A feed pipe 40 for fuel gas or the like extends upwardly through the conduit 35 to a point a short distance below the burner block 37. At this point the fuel gas and air, which is introduced through a pipe 41, are mixed preparatory to being introduced into the combustion chamber 17. Suitable control means such as valves (not shown) may well be employed in the regulation of the flow of fuel and air to the combustion chamber.

The circular trough which incidentally may assume various forms as to details of construction, is rotated by means of an electric motor 42 or the like (Fig. 1) operating through spur gears 43 and a worm 44 and worm gear 45, the latter suitably secured to the lower end of the column 12. This column, as will be observed in Fig. 4, rests upon the base portion 46 of the tube 36, there being interposed between them, suitable ball bearings 47 or other antifriction devices. Roller bearings 48 may well be arranged between the longitudinal faces of the column 12 and tube 36.

In operation the circular trough 10 is rotated at a speed determined by and variable in accordance with the production speed of the bottle blowing machine. Molten glass is constantly delivered to the circular trough by a supply trough 30 leading to a tank 31. The fuel mixture is introduced into the combustion chamber 17 by way of the ported burner block 37 and the products of combustion, due to the draft created in the flue 23 and stacks 32 and 34, are uniformly distributed so that a blanket of heat of substantially uniform temperature throughout is spread over the surface of the glass in the trough 10.

Adjustment to compensate for a necessary change in the location of a bottle forming machine relative to the supply tank 31 will involve moving the flue 23 with the cover and jack arch and necessitate interchanging the flue sections 26 so that the section including the supply trough 30 may be arranged in alignment with the outlet opening 31a of the supply tank. To accomplish this the stack section and two adjacent flue sections 26 (one on each side) are removed and the supplemental frame together with the remaining flue sections, jack arch and cover 18 are moved circumferentially until the gathering area 21 is properly positioned. Then those flue sections in front of the outlet opening 31a are removed and replaced by the stack section and said two adjacent flue sections. The space formerly occupied by the stack section and said two adjacent sections is filled in by those flue sections last removed. It may be explained here that with the conventional construction, compensation for any drastic change in the relative positions of the machine and supply tank or furnace is possible only by completely tearing down the superstructure of the revolving pot unit and rebuilding it.

While I have shown in the accompanying drawings a circular trough it is obvious that other well known forms of revolving containers may well be substituted therefor and employed in combination with an adjustable cover or roof.

Modifications may be resorted to within the spirit and scope of the appended claims.

What I claim is:

1. In combination, a container for a body of molten glass mounted for rotation about a vertical axis, means for delivering molten glass to the container, a cover formed to enclose a major portion of the glass in the container and create an exposed gathering area from which mold charges may be obtained, said cover including a horizontal flue extending partially around its periphery, stacks connected to said flue, and ports providing communication between said flue and the space between the cover and container.

2. In combination, a container for a body of molten glass, means for rotating the container about a vertical axis, a cover disposed above the container and enclosing only a major portion of said body of glass, a jack arch overlying a part of the glass not enclosed by said cover and shaped to define one margin of a gathering area, a flue extending partially about the periphery of the cover and having its ends terminating at the jack arch, ports providing communication between the space above the container and said flue, and stacks rising from the flue.

3. In combination, a circular trough having a central vertical opening therethrough, a support for the trough including a hollow vertical column, means for imparting rotary movement to the column to thereby said trough, a ported burner block in proximity to the upper end of the central opening, means for supplying a fuel mixture to the burner block, a cover arranged above a major portion of the trough and providing a combustion chamber above the latter and said block, means for regulably controlling the removal of waste gases from said chamber, and means for supplying molten glass to the trough.

4. In combination, a container for molten glass mounted for rotation about a vertical axis, means for supplying glass to the container, a jack arch arranged above the container and shaped to define one margin of an exposed gathering area of glass, a cover and horizontal flue enclosing the remainder of the glass and a portion of the periphery of the container, said flue having ports facing the container and arranged at least in part above the surface of the glass, and means for applying heat to the surface of the glass.

5. In combination, a horizontally revolving pot adapted to contain a body of molten glass, means for supplying glass thereto, a cover having one margin shaped to provide an exposed gathering area of glass, a hollow vertical column supporting the pot, said pot having a central vertical opening therethrough, a ported burner block in the upper end of said opening, and means for supplying air and raw fuel to the burner block and through the ports to a combustion chamber beneath said cover.

6. In combination, a container shaped to provide an annular channel adapted to contain a supply body of molten glass, means for supplying glass thereto, a cover overlying said container and having a marginal portion shaped to provide an exposed gathering area of glass in the channel, a hollow vertical column at least in part supporting the container and with the latter providing a central passageway through the container and into the space between the cover and container, a ported burner block at the upper end of said column and means for supplying air and raw fuel to the burner block and through the ports to the space between said cover and container.

CLARENCE C. KINKER.